US012065338B2

(12) United States Patent
Irving

(10) Patent No.: US 12,065,338 B2
(45) Date of Patent: Aug. 20, 2024

(54) TOOL FOR LIFTING MONUMENT HEADSTONES

(71) Applicant: IRVING TOOL, LLC, Afton, IA (US)

(72) Inventor: Kevin Irving, Afton, IA (US)

(73) Assignee: IRVING TOOL, LLC, Afton, IA (US)

( * ) Notice: Subject to any disclaimer, the term of this patent is extended or adjusted under 35 U.S.C. 154(b) by 247 days.

(21) Appl. No.: 17/806,894

(22) Filed: Jun. 14, 2022

(65) Prior Publication Data

US 2022/0396461 A1 Dec. 15, 2022

Related U.S. Application Data

(60) Provisional application No. 63/202,523, filed on Jun. 15, 2021.

(51) Int. Cl.
*B66F 15/00* (2006.01)
*B66F 3/08* (2006.01)
*B66F 11/00* (2006.01)

(52) U.S. Cl.
CPC ................ *B66F 15/00* (2013.01); *B66F 3/08* (2013.01); *B66F 11/00* (2013.01)

(58) Field of Classification Search
CPC ........................................................ B66F 11/00
See application file for complete search history.

(56) References Cited

U.S. PATENT DOCUMENTS 5,209,536 A * 5/1993 Rogers, Sr. ............. B66C 1/447
294/197

FOREIGN PATENT DOCUMENTS

| | | | |
|---|---|---|---|
| DE | 19729839 A1 | * | 1/1998 |
| JP | 10-37531 A | * | 2/1998 |
| JP | 11-93460 A | * | 4/1999 |
| WO | WO-83/01436 A1 | * | 4/1983 |

* cited by examiner

*Primary Examiner* — Jeffry H Aftergut
(74) *Attorney, Agent, or Firm* — McKee, Voorhees & Sease, PLC

(57) ABSTRACT

The tool is provided for removing a monument headstone adhered to the base and lifting the headstone. The tool includes a clamp to grip the headstone and a lever arm extending from the clamp to exert a tilting force on the headstone so as to break the adhesion between the headstone and the base. Then, a lifting assembly can be attached to the clamp to raise the headstone.

15 Claims, 10 Drawing Sheets

TOOL FOR LIFTING MONUMENT HEADSTONES

CROSS REFERENCE TO RELATED APPLICATIONS

This application claims priority under 35 U.S.C. § 119 to provisional patent application U.S. Ser. No. 63/202,523, filed Jun. 15, 2021. The provisional patent application is herein incorporated by reference in its entirety, including without limitation, the specification, claims, and abstract, as well as any figures, tables, appendices, or drawings thereof.

TECHNICAL FIELD

The invention is directed to a tool and method for clamping to a cemetery headstone, and then breaking the seal between the headstone and its base, and for lifting the headstone. The tool can also be used to lift other stone monuments and building materials, and similar heavy objects, without damaging the stone or object.

BACKGROUND

Monuments, such as tombstones at cemeteries, typically include an upstanding headstone with engraving or a plaque having the name and other information about the deceased person or other historical event. The headstone normally is mounted on a base set in the ground, with the headstone and base glued or adhered together. Over time, the base may settle, such that they headstone is no longer vertical. Since the headstone and base are usually made of stone, such as granite, there is substantial weight which requires lifting equipment for straightening or repairing the tombstone or monument. Often, it is desirable to separate the headstone from the base, such that the base can be leveled, and then the headstone re-attached. However, breaking the adhesion or seal between the headstone and the base can be difficult. Hitting or hammering the headstone can lead to damage, which is highly undesirable. Using a vehicle or other equipment, such as a backhoe, to separate the headstone from the base can also result in chipping or cracking of the stone, and thus costly replacement or repair.

Therefore, a primary objective of the present invention is the provision of a tool for manually breaking the adhesive seal between the headstone and the base so that the headstone can be lifted off the base.

Another objective of the present invention is the provision of a tool for clamping the headstone, with a lever to tilt the headstone and thereby break the adhesion between the headstone and the base.

A further objective of the present invention is the provision of a tool for lifting stone monuments and other heavy objects, without damaging the stone or object.

Yet another objective of the present invention is the provision of a tool to assist in the leveling of cemetery tombstones.

Another objective of the present invention is the provision of a tool for breaking the seal between a headstone and base on a cemetery monument.

Yet another objective of the present invention is the provision of a method of leveling a cemetery monument without damage.

Still another objective of the present invention is the provision of a tool for lifting stone building materials without drilling holes or using screws in the stone material.

These and/or other objects, features, and advantages of the disclosure will be apparent to those skilled in the art. The present invention is not to be limited to or by these objects, features and advantages. No single embodiment need provide each and every object, feature, or advantage.

SUMMARY

The tool of the present invention is adapted to clamp onto a headstone of a monument to assist in breaking the adhesive seal between the headstone and the base such that the headstone can be removed from the base. The tool comprises a clamp with opposing legs to fit on opposite sides of the headstone. A screw allows legs to be tightened to securely clamp the headstone between the legs. A lever arm is connected to the tool and can be manually or mechanically raised so as to apply a moment or rotational force to the headstone, thereby tilting the headstone to break the seal. Then, a hook from a crane or other lifting equipment can be connected to the tool, while still clamped to the headstone, such that the crane can lift the headstone off of the base, and set aside so that the base can be leveled or so that repair work can be done on the headstone. The tool is also used to reset the headstone onto the base using the crane to lower the headstone into position on the base of the monument.

BRIEF DESCRIPTION OF THE DRAWINGS

The FIG. 1 shows a first embodiment of the tool of the present invention clamped to a headstone.

DETAILED DESCRIPTION

Figure 1:
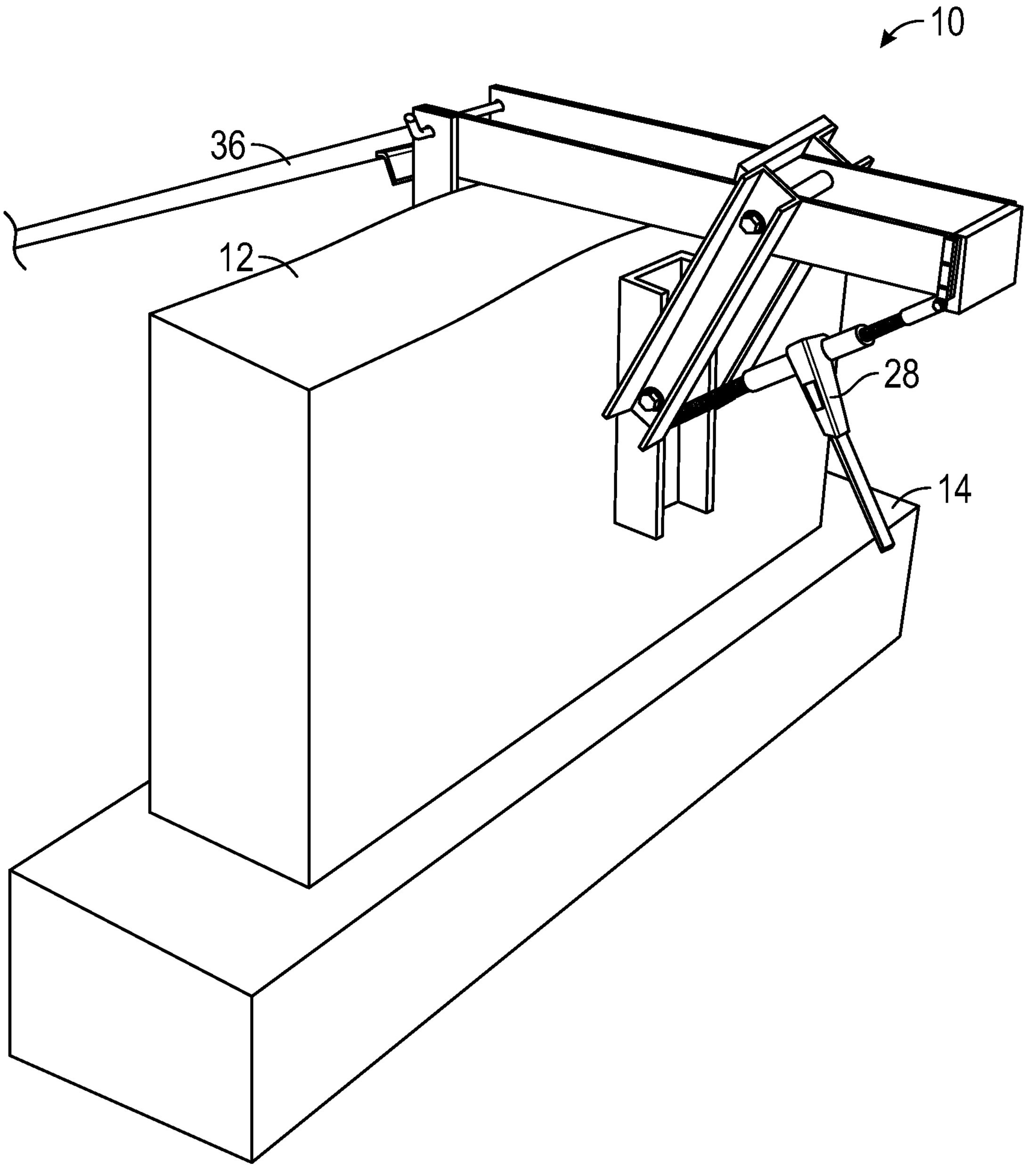

The tool for lifting headstones, according to the present invention, is generally designated in the drawings by the reference numeral 10. The tool is adapted to clamp to a headstone 12 adhered to a base 14 of a tombstone in a cemetery, or to the headstone of other types of monuments.

A first embodiment of the tool 10 is shown in FIG. 1. The tool 10 includes a pair of clamp legs 16, 18 which are connected to an upper crossbar 20. The first clamp leg 16 is preferably fixed to the crossbar 20 by welding, bolts, or any other convenient means. The second clamp leg 18 is pivotally attached to the crossbar 20 via a connecting arm 22. The upper end of the connecting arm 22 is pivotally connected to the crossbar 20 by a pin 24, and the lower end of the connecting arm 22 is pivotally connected to the clamp 18 by a pin 26. Preferably, the clamp legs 16 and 18 have pads made of rubber, silicone, or other gripping material to increase friction with the surface of the headstone.

In the first embodiment of the clamping tool 10, the pivotal movement of the clamp leg 18 is controlled by a turnbuckle 28. The turnbuckle 28 has one end detachably connected to the crossbar 20 by a pin 30 and an opposite end detachably connected to the clamp leg 18 by a pin 32. The turnbuckle 28 includes a handle 34 which can be rotated in opposite directions on the screw threads of the turnbuckle shaft so as to extend or retract the turnbuckle, thereby tightening or loosening the clamp leg 18 relative to the clamp leg 16. Thus, the turnbuckle 28 can be retracted so as to increase the space between the clamp legs 16, 18 such that the tool 10 can be positioned downwardly over the top of the headstone 12. Then, the turnbuckle handle 34 can be turned to move the pivotal clamp leg 18 toward the fixed clamp leg 16 and thereby tightly securing the headstone 12 between the clamp legs 16, 18.

A lever arm 36 is connected to the upper end of the first clamp leg 16 or to the crossbar 20. Preferably, the lever arm 36 is detachably connected by a pin or bolt, after the clamps legs 16, 18 are tightened on the headstone 12. After the lever arm 36 is attached, a person can grip the outer end of the lever arm and pull upwardly so as to apply a torque or moment force via the clamp legs 16, 18 to the upper edge of headstone 12, so as to break the adhesive seal between the headstone 12 and the base 14.

After the bond between the headstone 12 and the base 14 is broken, the lever arm 36 can be removed and lifting assembly can be attached to the tool 10 for lifting the headstone 12 off of the base 14. For example, a crane or hoist hook 38 on a cable can be attached to the crossbar 20 in any convenient manner, such as a pin or bolt 40 extending through a portion of the crossbar 20, with a clevis 42 mounted on the pin or bolt 40. The hook 38 can be extended into the clevis 42, and then the crane, hoist, or other lifting machine can lift the headstone 12 off of the base 14. After the base 14 is leveled, or the headstone 12 repaired, the headstone can be lowered back into position on the base 14, with new adhesive therebetween, using the tool 10. The clamping action of the tool 10 onto the headstone 12 eliminates the need for any holes, screws, bolts, or pins in the headstone for lifting. The tool 10 does not extend into or otherwise penetrate the headstone 12. Thus, the headstone can be moved without damaging the headstone and without any modifications to the headstone.

Figure 2:
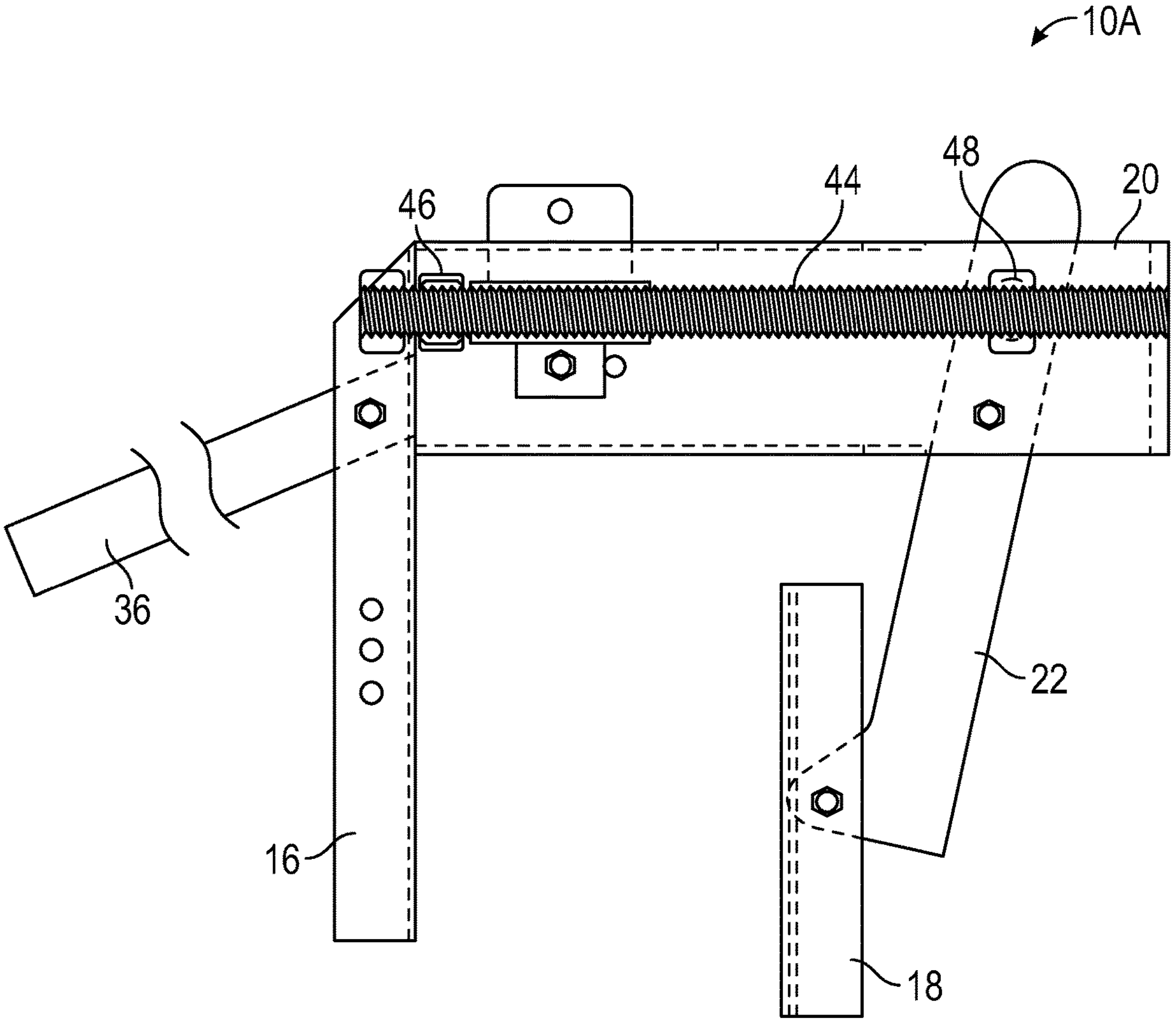
FIG. 2 is a side elevation view of a second embodiment of the tool of the present invention.

A second embodiment of the tool 10A is shown in FIG. 2. The basic structure of the tool 10A is the same as the tool 10, regarding the clamps legs 16, 18, the crossbar 20, the connecting arm 22, and the lever arm 36. The turnbuckle 28 of the tool 10 is replaced in the tool 10A with a threaded shaft 44 is mounted within the crossbar 20. One end of the shaft 44 includes a fixed nut 46 adapted to receive a socket or a wrench to turn the shaft 44. The opposite end of the shaft 44 includes a nut 48 fixed to the connecting arm 22. Thus, rotation of the shaft 44 causes the nut 48 to move along the threads, thereby carrying the upper end of the connecting arm 22 along the crossbar 20 and pivoting the lower end of the connecting arm 22 so as to tighten and loosen the pivotal clamp leg 18.

The tool 10A includes a lifting tab 50 extending upwardly from the crossbar 20, into which the clevis 42 or hook 34 can be attached for lifting the tool 10A with a headstone 12 clamped thereto.

A third, preferred embodiment, of the invention is shown in FIGS. 3-12 and is similar to the second embodiment, except that the shaft 44A for adjusting the pivotal clamp leg 18 is positioned at the opposite end of the cross arm 20. The adjustment shaft 44A extends through a hole in an end plate 52 of the cross arm 20 and is attached to the connecting arm 22. A nut 54 on the shaft 44A can be turned clockwise or counterclockwise so that the link arm 22 pivots around a pin or bolt 56 so as to tighten or loosen the clamp leg 18 relative to the fixed clamp leg 16.

Figure 3:
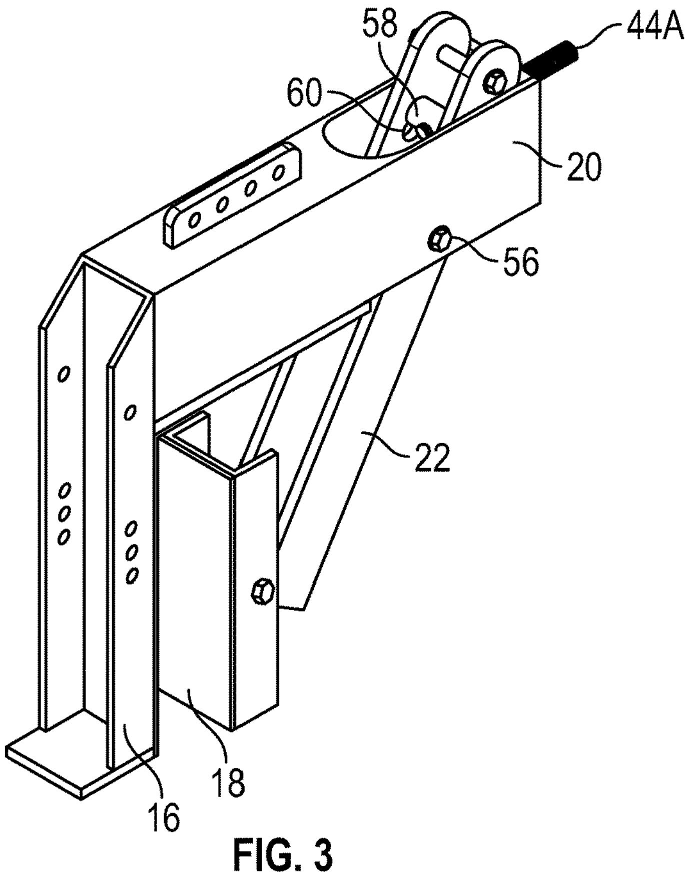
FIG. 3 is a perspective view of one embodiment of the clamping and lifting tool of the present invention, shown in a closed position.
Figure 4:
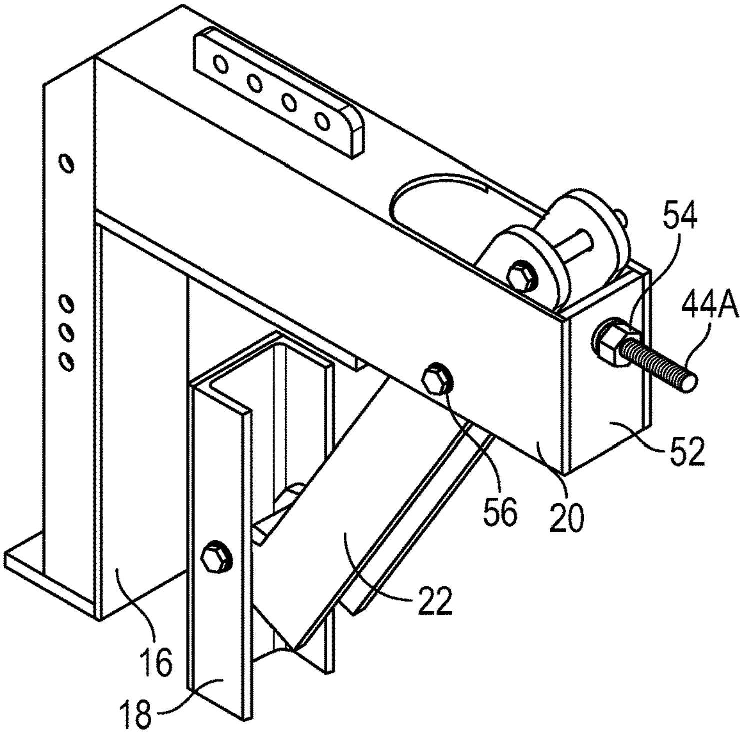
FIG. 4 is another perspective view of the tool shown in FIG. 3.
Figure 5:
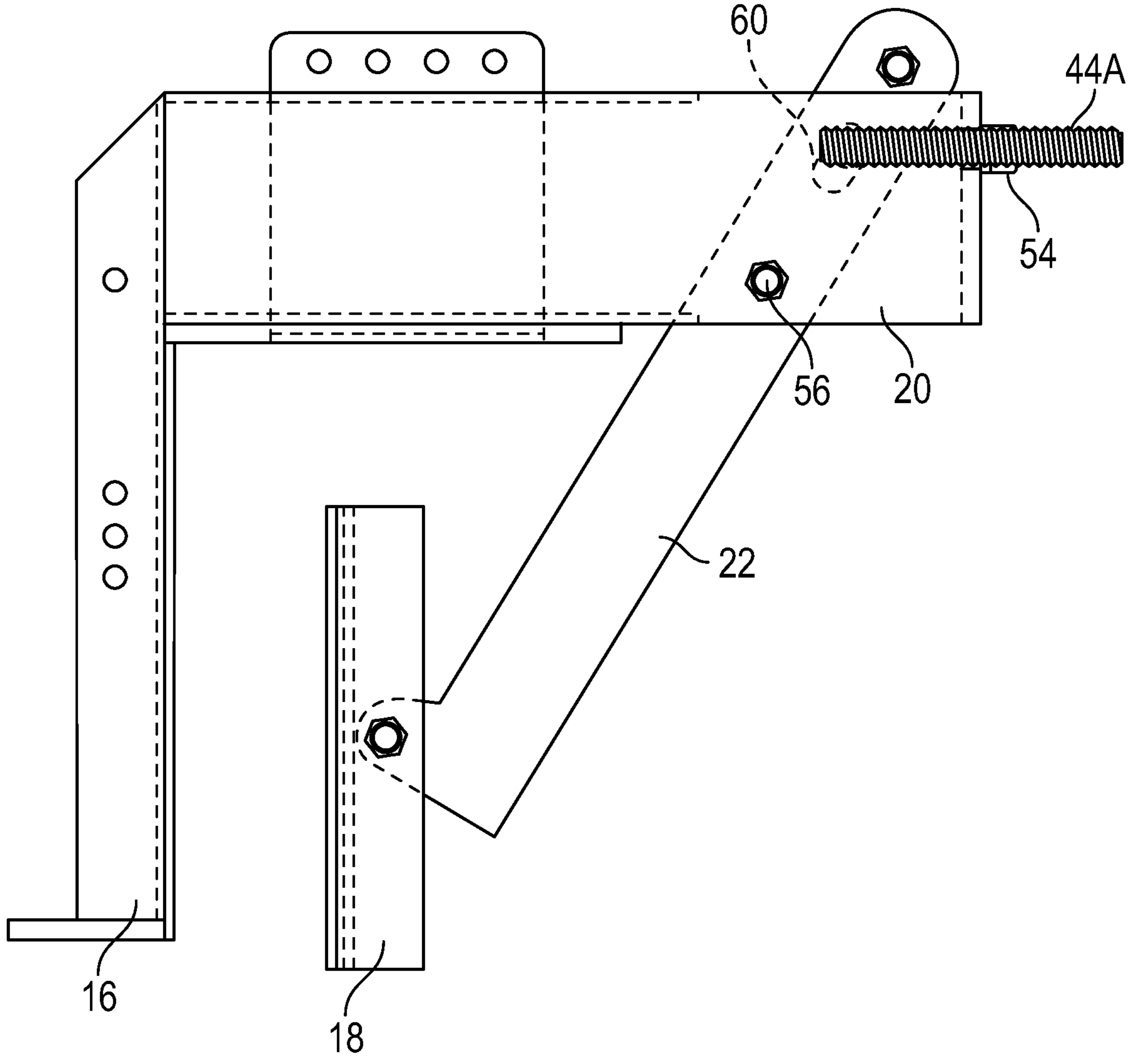
FIG. 5 is a side elevation view of the tool for FIG. 3.
Figure 6:
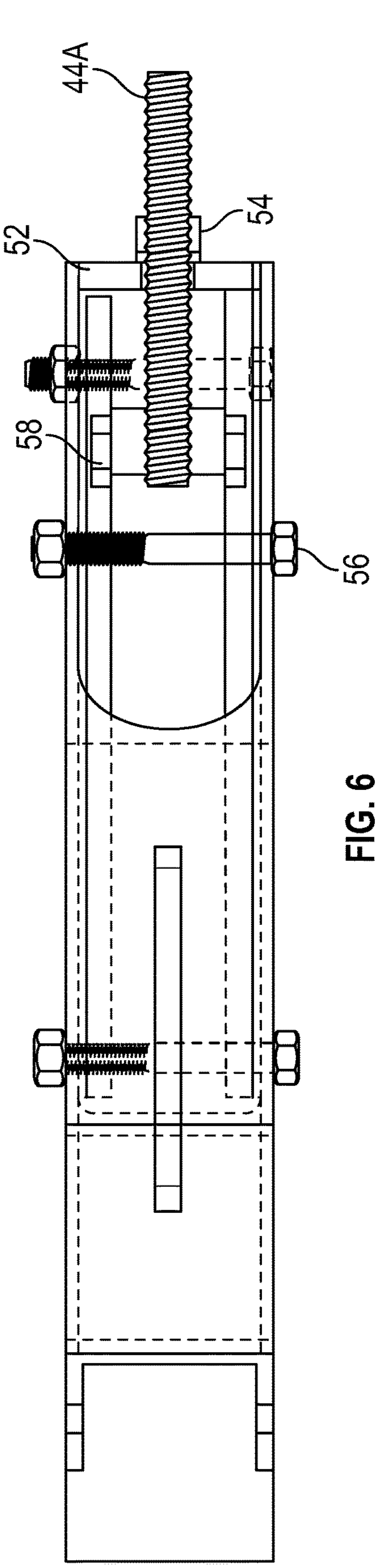
FIG. 6 is a top plan view of the tool of FIG. 3.
Figure 7:
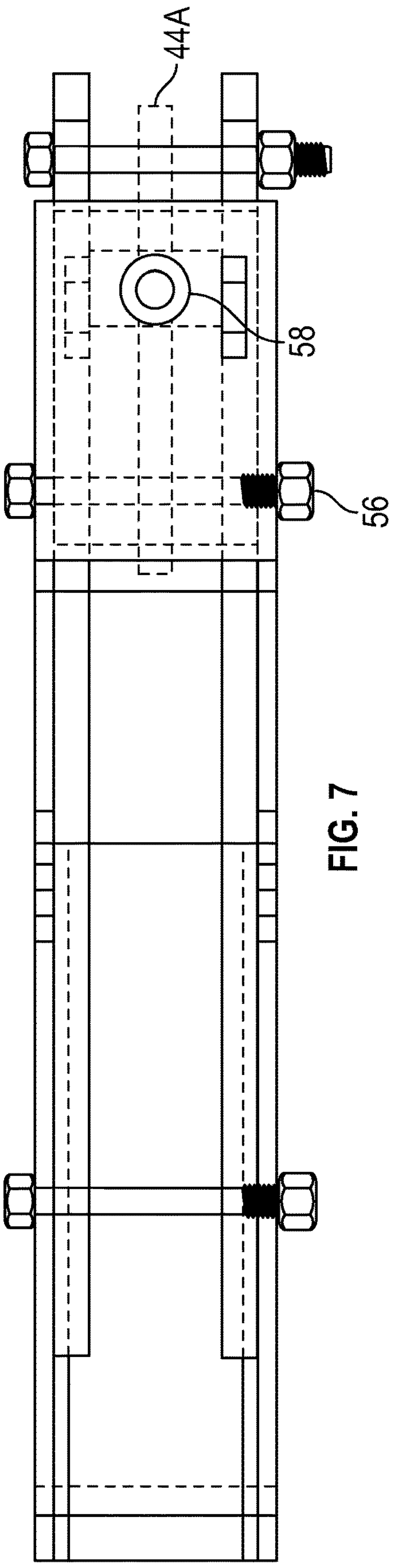
FIG. 7 is an end elevation view of the tool of FIG. 3.

The inner end of the thread shaft 44A is welded to a transverse collar 58 extending between the opposite sides of the lever arm 22. The opposite ends of the collar have a reduced diameter for sliding receipt in slots 60 in the opposite sides of the lever arm 22. Thus, when the nut 54 is tightened, the collar 58 slides upwardly in the slots 60, to pull the upper end of the lever arm 22 to the right, as seen in FIG. 3, thereby pivoting the lower end of the lever arm blank to the left, thereby tightening the clamp leg 18. When the nut 54 is loosened, the lever arm 22 moves in the opposite direction, with the collar 58 sliding downwardly in the slots 60, to loosen the clamp leg 18.

Figure 10:
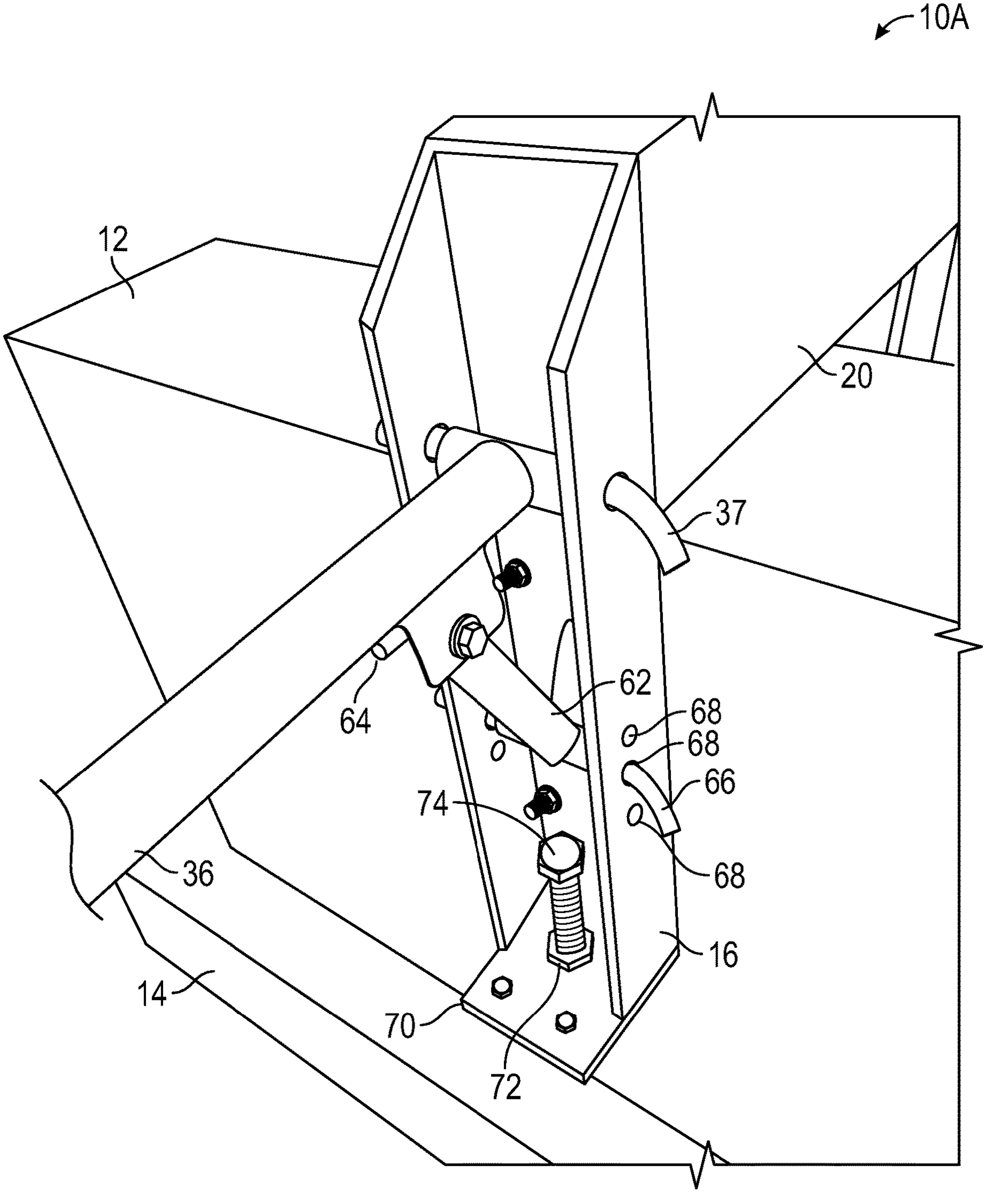
FIG. 10 is an enlarged, close view of the handle end of the tool.
Figure 11:
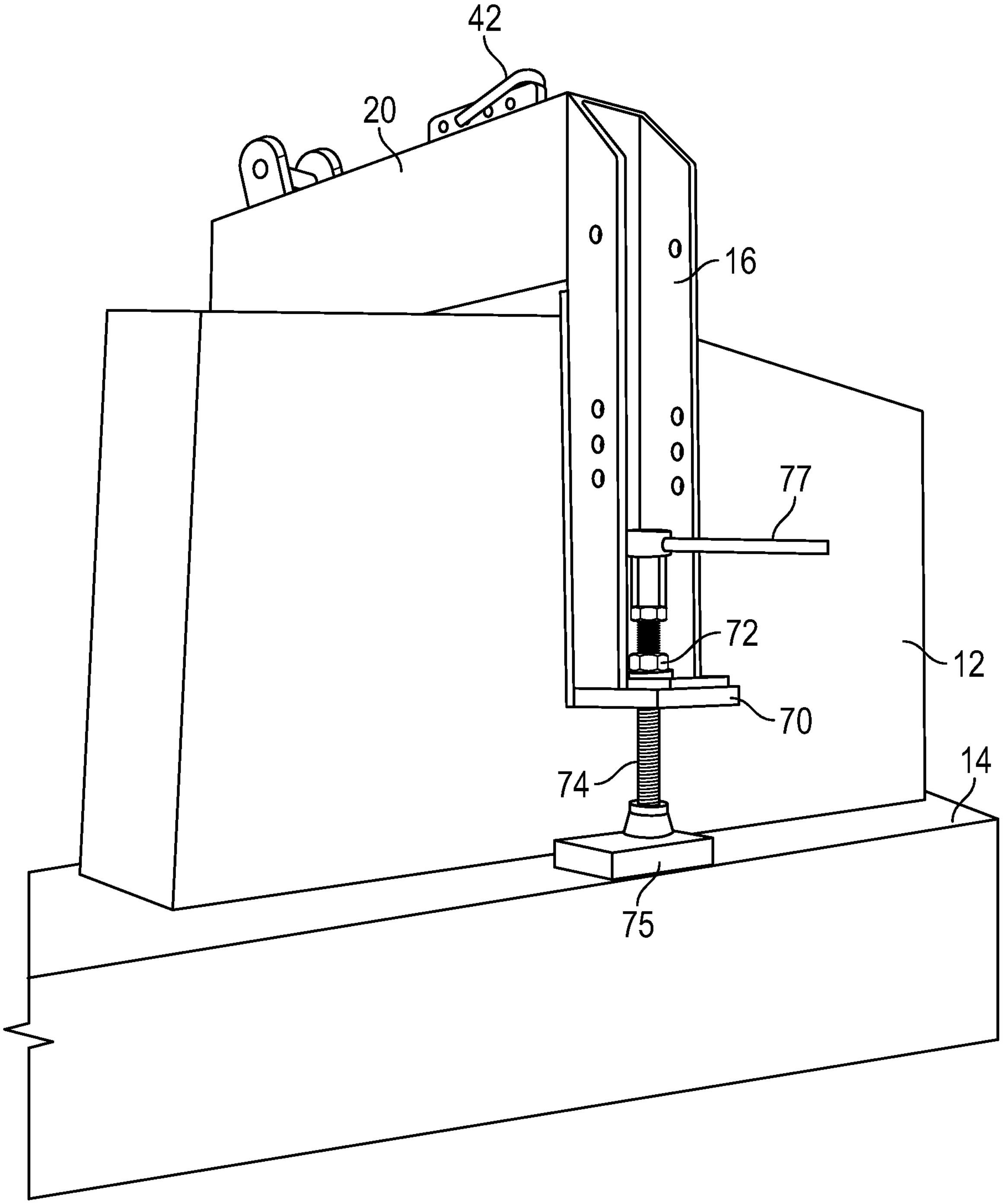
FIG. 11 shows the tool clamped to a headstone and being lifted by a crane.

In the tool 10A of both the second and third embodiments, the handle 36 is pinned or bolted to the vertical clamp leg 16 near the upper end of the clamp leg 16. As seen in FIG. 10, the handle 36 may have a collar or T-shaped head through which a pin or bolt extends. The pin 37 may be retained by a cotter pin (not shown), or by a bolt and a nut. A lever arm 62 extends between the handle 36 and the clamp leg 16. The upper end of the lever arm 62 is retained between a pair of flanges 64 welded to the arm 36, and is retained by a pin or by bolt and a nut. The lower end of the lever arm 62 includes a collar or tube residing between the sides of the clamp leg 16 and retained by a pin 66 or a bolt and a nut, extending through any one of a line holes 68 and the sidewalls of the clamp leg 16. The different holes 68 allow the leverage from the handle 36 to be changed, as needed.

Figure 9:
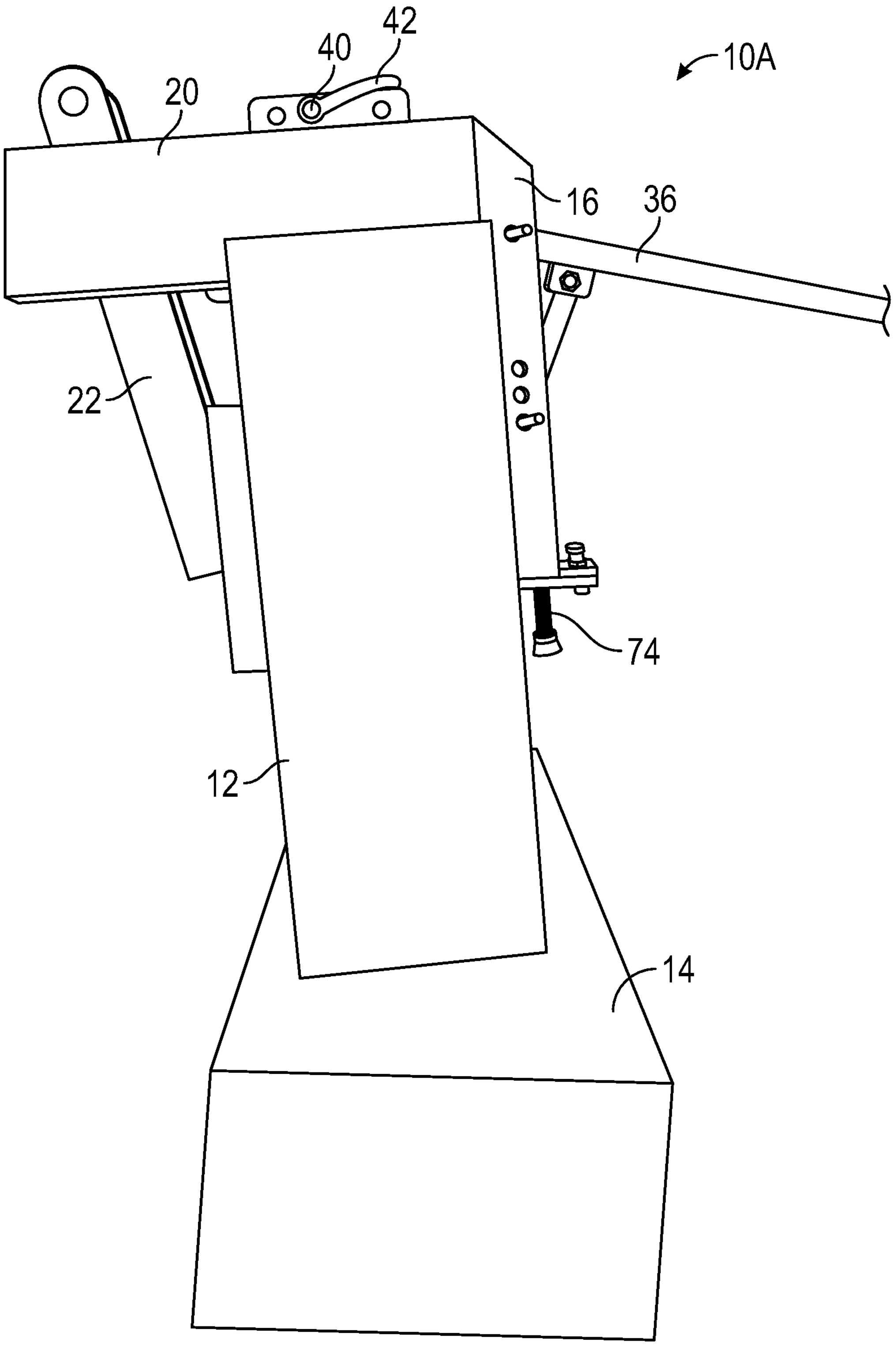
FIG. 9 shows the tool positioned on a headstone, and with the handle lifted upwardly so as to break the adhesive seal between the headstone and the base.
Figure 12:
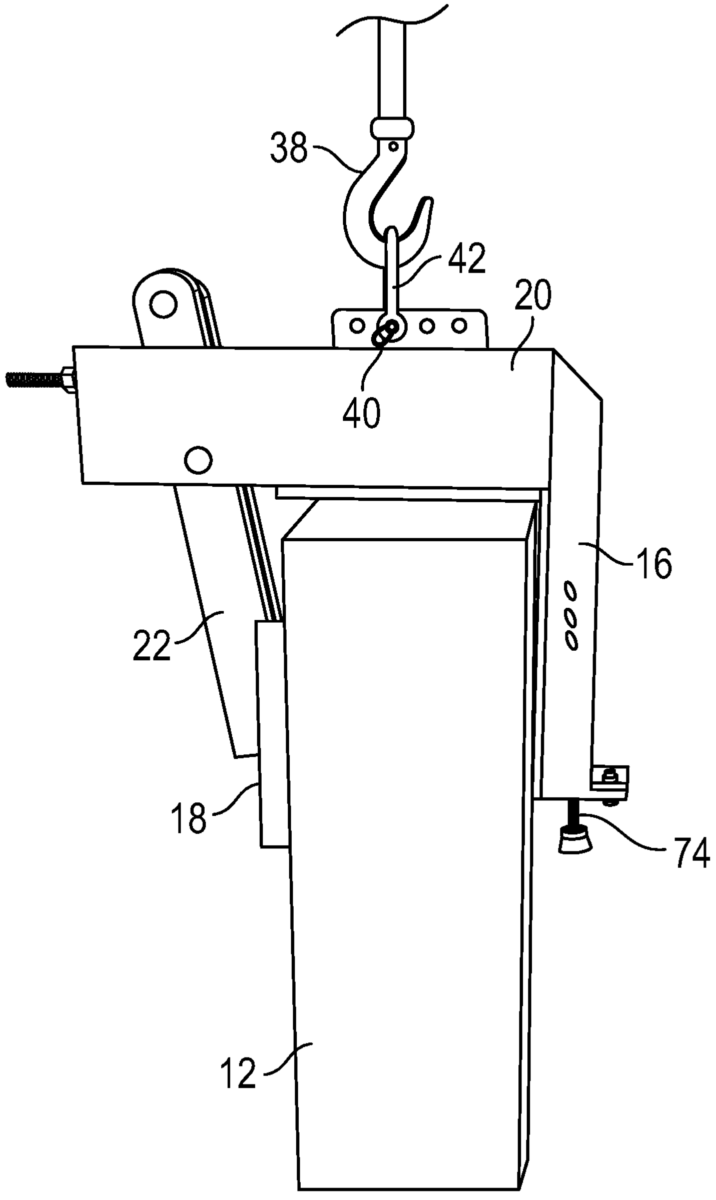
FIG. 12 is a side elevation view of another embodiment of the tool.

When the tool 10A is clamped to the headstone, the handle 36 can be lifted to tip the headstone rearwardly, as shown in FIG. 9, or can be pushed downwardly toward the ground, to tip the headstone forwardly. Thus, the handle can be pushed or pulled to break the adhesion between the headstone and the base. Then, the hook 38 of the crane or boom lift can be hooked through the clevis 42 to lift the headstone, as shown in FIG. 12.

Figure 8:
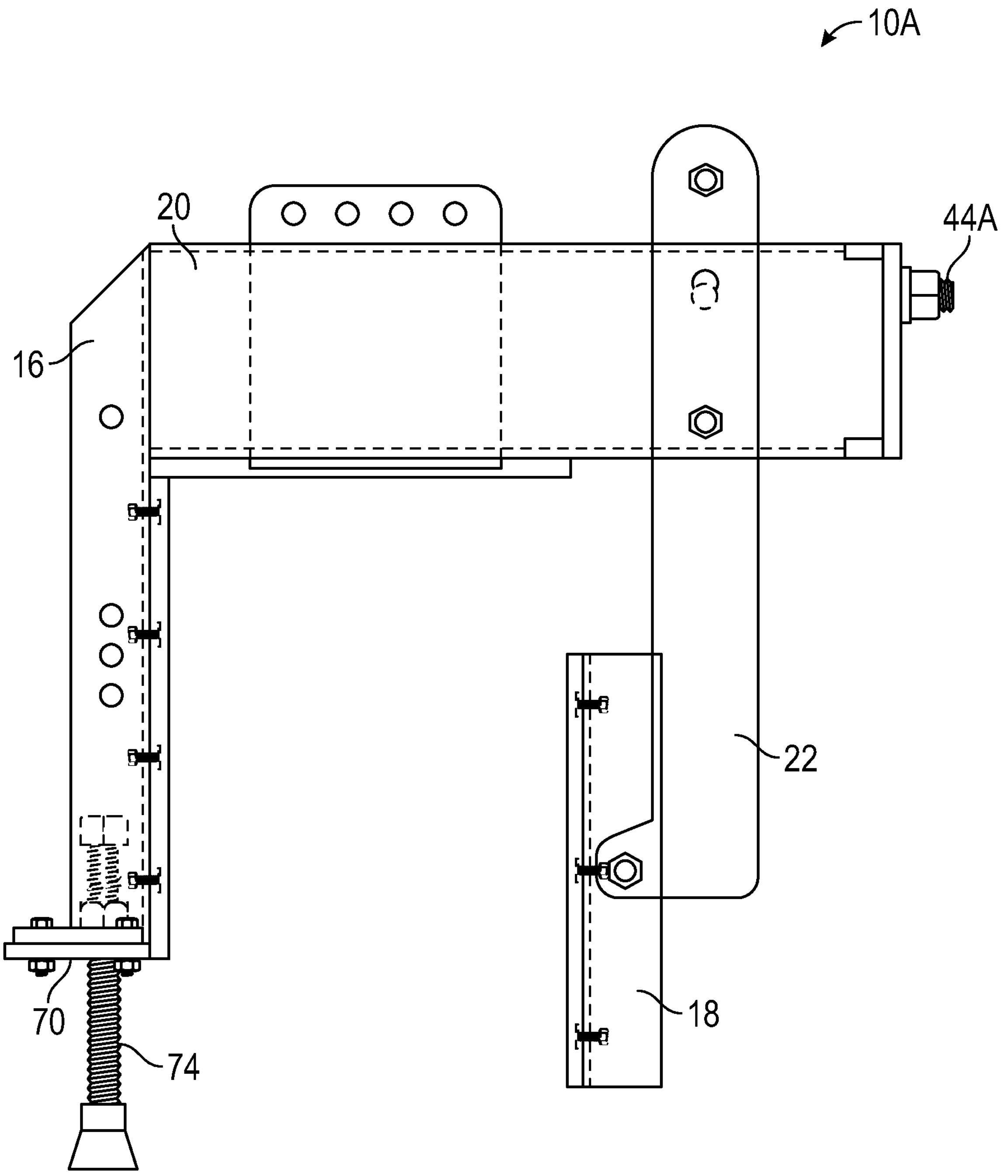
FIG. 8 is another side elevation view of the tool of FIG. 3 in an open position, and having a screw jack added in place of the handle.

A screw jack alternative to the handle 38 for breaking the adhesive seal between the headstone and the base is best seen in FIGS. 8 and 10. A plate 70 is welded on the bottom end of the clamp leg16. The plate 70 includes a hole, with a nut 72 fixed to the plate 70 in alignment with the hole. A bolt 74 is threaded through the nut 72. As an alternative to the nut 72, the hole in the plate 70 may be threaded for receipt of the bolt 74. The lower end of the bolt 72 includes a second nut or a plate fixed thereto. A board 75 can be positioned between the lower end of the bolt 74 and the granite base to protect the base as the nut 72 is turned with a socket wrench 77 to extend the bolt downwardly through the nut 72 while the tool 10 is clamped to the headstone. Continued turning of the bolt 74 by the wrench eventually breaks the adhesive seal between the headstone and the base, Thus, the adhesion between the headstone and the base can be broken by either the handle 36 or by the screw jack bolt 74, both of which function as a lever arm to pry the headstone slightly upwardly from the base. Lifting the handle 36 raises the lower front corner of the headstone upwardly away from the base. Pushing downwardly on the handle 36 pries the rearward bottom corner of the headstone upwardly away from the face. Similarly, the bolt 74 forces the adjacent bottom edge of the headstone upwardly, away from the base.

The screw jack bolt 74 provides 10× more force than does the handle 36. The handle 36 can also be used if the monument needs turned around. For instance, after the edge of the headstone is raised from the base, a 2 inch block of wood is positioned under the center of the headstone, which allows an operator to grasp the handle 36 to spin the headstone very easily with no other assistance from a machine. The handle 36 and bolt 74 also allow the headstone to be tilted so that the bottom can be cleaned and resealed without a machine lifting or the monument being removed completely.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. A tool for removing a monument headstone adhered to a base comprising:

a clamp to grip the headstone; and a lever arm extending from the clamp for exerting a tilting force to the headstone to break the adhesion between the headstone and the base.

2. The tool of claim 1 wherein the clamp has opposing legs adapted to reside on opposite sides of the headstone and a threaded shaft operatively connected to one of the legs to move the one leg toward and away from the other leg upon rotation of the shaft in opposite directions.

3. The tool of claim 1 further comprising a tab on the clamp adapted to receive a hook to lift the headstone.

4. The tool of claim 1 wherein the clamp includes a fixed arm and a movable arm for clamping the headstone therebetween.

5. The tool of claim 4 wherein the clamp includes an upper bar and a pair of spaced apart legs extending downwardly from the bar, with at least one of the legs being movable to adjust the space between the fixed and movable arms so that the clamp fits over a top of the headstone.

6. The tool of claim 5 wherein the clamp further includes a screw to apply pressure to the movable arm.

7. The tool of claim 1 wherein the lever arm includes a handle connected to the clamp to manually exert a force on the headstone away from the base.

8. The tool of claim 1 wherein the lever arm includes a screw jack.

9. The tool of claim 8 wherein the screw jack has a bolt extending through a threaded aperture on the clamp and being downwardly extendable to force the clamp and headstone apart from the base to thereby break the adhesion there between.

10. A method of breaking an adhesive seal between a monument headstone and a base, comprising:

clamping a tool to the headstone; and applying a force to the tool to raise a forward or rearward bottom edge of the headstone away from the base to break the adhesive seal.

11. The method of claim 10 further comprising using a lever to apply the force.

12. The method of claim 10 wherein the force is a rotational force.

13. The method of claim 10 further comprising lifting the clamping tool after the adhesive seal is broken to raise the headstone off of the base.

14. The method of claim 13 wherein the headstone is lifted without modifying the headstone.

15. The method of claim 10 further comprising connecting a hook to the clamp and raising the hook to move the headstone from the base.

* * * * *